Figure 3:
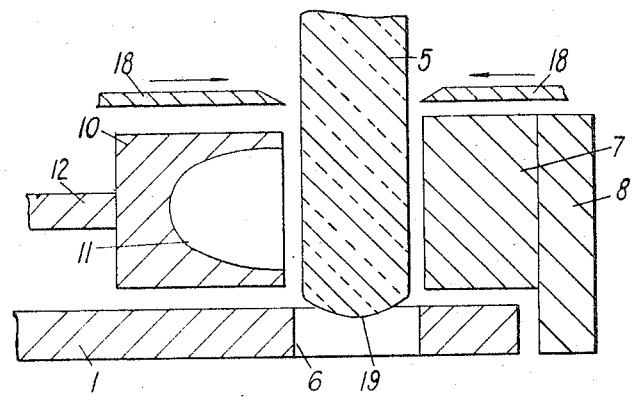

Feb. 28, 1967   W. E. FORBER   3,306,723
APPARATUS FOR THE MOULDING OF GLASS ARTICLES
Filed June 28, 1963   2 Sheets-Sheet 1
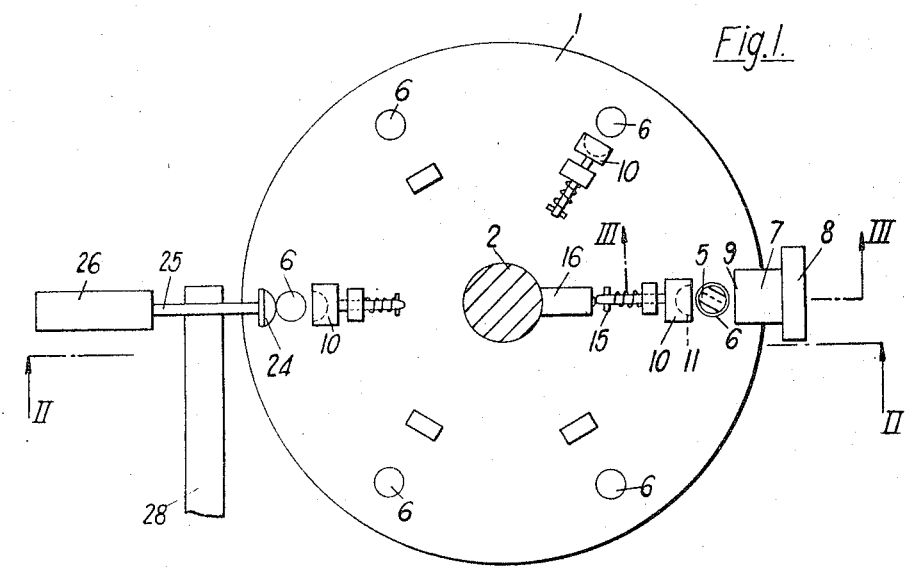
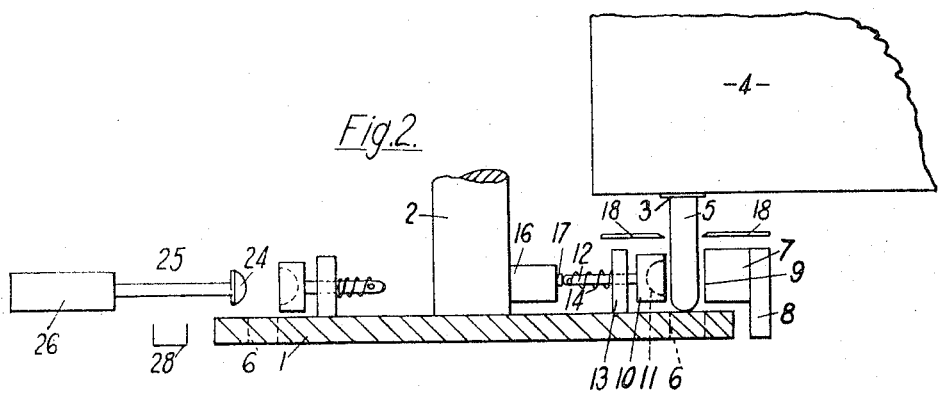
Inventor
William Edward Forber
By
Morrison, Kennedy & Campbell
Attorneys United States Patent Office 3,306,723
Patented Feb. 28, 1967

3,306,723
APPARATUS FOR THE MOULDING OF
GLASS ARTICLES
William Edward Forber, Rhyl, Wales, assignor to Pilkington Brothers Limited, Liverpool, England, a corporation of Great Britain
Filed June 28, 1963, Ser. No. 291,402
Claims priority, application Great Britain, July 11, 1962, 26,704/62
3 Claims. (Cl. 65—184)

This invention relates to the moulding of glass articles and in particular to the moulding of small glass articles such as lenses.

It is customary to mould small glass articles, for example lens blanks, by employing a rotary table moulding machine which has a number of moulds equispaced around the table. The table rotates in a step-wise manner through a number of stations. In one of these stations the mould receives a charge of molten glass, at another station the glass is pressure moulded by a pressure member which descends on to the mould, and at a further station the moulded article is removed from the mould when the article has stiffened sufficiently to hold its shape.

The charge of molten glass, which is fed to each mould in turn, is normally cut by shears from a rod-shaped stream of molten glass which is delivered downwardly from the floor of a glass melting furnace located about the table, and each gob of molten glass severed from the descending mass of glass falls directly or is fed by chutes into the mould at the moulding station.

The severing of the gob of molten glass by means of shears causes cooling of the glass along the plane of the cut, and in particular leaves two "ears" of cooled glass at the sides of the bottom of the descending mass of glass. These "ears" are at the bottom of the next gob to be cut, and it has been found that if the cooled glass in these "ears" is eventually situated at the surface of the moulded article, surface faults result.

Also the bottom surface of the gob is cooled by contact with the chute as it slides down the chute into the mould, and there is general cooling of the exposed surface of the gob as it slides down the chute. The cooled surface glass of the gob is usually located at the surface of the moulded article and this gives rise to surface wrinkle in the moulded article because the cooled glass does not completely conform to the mould.

Surface imperfections of this nature are usually removed by a final grinding and polishing of the moulded articles, for example, lenses, and it is a main object of the present invention to provide an improved moulding method and apparatus for producing moulded glass articles whose surface finish is such that grinding and polishing is not necessary.

A further object of the invention is to provide a method and apparatus for moulding aspherical lenses.

According to the invention there is provided a method of moulding glass articles, characterised by intercepting in a mould a predetermined volume of molten glass at the free end of a descending body of molten glass, whereby the mould meters the volume of glass in the course of effecting the moulding operation.

Further according to the invention a method of moulding glass articles is characterised in that the mould is actuated to intercept a predetermined volume of molten glass at the free end of a descending body of molten glass in proximity to an anvil, whereby the mould meters the volume of glass and imprisons that volume against the anvil in the course of effecting the moulding operation.

Because the mould intercepts the body of molten glass as it descends, for example from a glass melting furnace, the moulding operation is carried out right under the furnace before there has been any appreicable cooling of the surface of the descending body of glass. The glass imprisoned between the mould and the anvil thus conforms faithfully to the surface of the mould and surface wrinkle on the moulded article is obviated.

The invention also comprehends a method of moulding glass articles characterised by actuating a mould to intercept a predetermined volume of molten glass at the free end of a descending body of molten glass, and severing the intercepted glass from the descending body, whereby the mould meters a predetermined volume of the severed glass lying between the severed ends of the glass, and imprisons that volume against an anvil in the course of the moulding operation.

The cooled "ears" of glass at the ends of each severed glass are thus excluded from the mould which meters the predetermined volume of molten glass from the glass lying between the severed ends.

Further according to the invention a method of moulding glass articles is characterised by continuously forming a descending body of molten glass, actuating a mould to intercept a predetermined volume of molten glass at the free end of said descending body of glass and to imprison that volume against an anvil, severing the intercepted glass from the descending body, withdrawing the mould from the anvil when the imprisoned glass has stiffened sufficiently to hold its moulded shape, and removing the moulded article from the mould.

The invention also comprehends apparatus for moulding glass articles, comprising means for forming a descending body of molten glass, mould members respectively mounted on opposite sides of the path of descent of said molten glass, and actuating means connected to the mould members and operable to produce relative movement of the mould members towards each other to intercept a predetermined volume of said molten glass and imprison it between the mould members, and to produce relative movement of the mould members away from each other when the moulded glass has stiffened sufficiently to hold its shape.

The invention further provides apparatus for moulding glass articles, comprising means for forming a descending body of molten glass, a mould and a cooperating anvil respectively mounted on opposite sides of the path of descent of said molten glass, and actuating means connected to the mould and operable to thrust the mould towards the anvil whereby the mould intercepts a predetermined volume of said glass and imprisons it against the anvil, and operable to withdraw the mould from the anvil when the moulded glass has stiffened sufficiently to hold its shape.

Preferably apparatus according to the invention for moulding glass articles comprises means for forming a descending body of molten glass, a mould and a cooperating anvil mounted respectively on opposite sides of the path of descent of the molten glass, actuating means connected to the mould and operable to thrust the mould towards the anvil whereby the mould intercepts a predetermined volume of said descending body of molten glass and imprisons that volume against the anvil, and shears arranged to sever the intercepted glass from the descending body, said actuating means being operable to move the mould away from the anvil when the moulded glass has stiffened sufficiently to hold its shape.

Although the moulding apparatus according to the invention may comprise a single mould and a co-operating anvil, a number of moulds may be provided which co-operate in succession with the single fixed anvil, and a preferred construction of apparatus according to the invention comprises means for forming a descending body of molten glass, a fixed anvil mounted on one side of the path of descent of said molten glass, a rotatable table mounted on the other side of said path, a plurality of displaceable moulds mounted on said table, means for rotating the table step-wise through a number of stations including a moulding station at which the moulds are successively located opposite the anvil and a take-out station at which moulded articles are removed from the moulds, actuating means operable to thrust the mould at the moulding station towards the anvil whereby the mould intercepts a predetermined volume of said descending body of molten glass and imprisons that volume against the anvil, and shears mounted above the anvil and operable to sever the intercepted glass from the descending body, said actuating means being further operable to withdraw the mould from the anvil when the moulded glass has stiffened sufficiently to hold its shape.

At the moulding station the moulds are thrust against the anvil in turn and in order to effect this each mould is mounted on one end of a stem slidably carried in a block fixed to the table, a return spring extends between said block and a stop fixed to the other end of the stem, which spring normally maintains the mould withdrawn towards the block, and the actuating means includes means fixed relative to the anvil at the moulding station and operable to thrust the stem carrying the mould towards the anvil and to hold the mould against the anvil for a predetermined time before retraction of the thrusting means permits the return spring to withdraw the mould carrying the moulded article.

Preferably the thrusting means includes a cylinder fixed relative to the anvil, a piston slidable in the cylinder and connected to a piston rod which transmits thrust to said stem, and means for supplying fluid under pressure to the cylinder to control the movement of the piston in time with the step-wise rotation of the table.

The anvil as well as the mould may be shaped to impart a desired form to the moulded article, but for moulding a lens having one plane face, the face of the anvil against which the glass is imprisoned is flat, and the cavity of the mould is shaped to form the other face of the lens. The moulded lens may be plano-concave or a plano-convex lens, and may be spherical or aspherical.

The invention also comprehends moulded glass articles produced by a method as set out above, and in particular moulded glass lenses which are formed in the mould with a brilliant surface finish so that no grinding and polishing is necessary. This is particularly advantageous for the manufacture of aspherical lenses whose grinding and polishing is difficult and the invention also comprehends aspherical lenses, for example projector lenses, moulded by a method according to the invention.

In order that the invention may be more clearly understood, an embodiment thereof for moulding high power plano-convex lenses will now be described, by way of example, with reference to the accompanying drawings, in which:

FIGURE 1 is a plan view, partly in section, of a rotary table moulding apparatus according to the invention, FIGURE 2 is a section on line II—II of FIGURE 1, and FIGURES 3 to 6 illustrate, as a section on line III—III of FIGURE 1, the stages of a moulding operation according to the invention.

In the drawings the same references indicate the same or similar parts.

Referring to FIGURES 1 and 2 of the drawings, a rotary table 1 is mounted on a fixed shaft 2 under an outlet 3 from a glass melting tank 4, which delivers a descending body 5 of molten glass. In the embodiment illustrated the descending body 5 of molten glass accordingly is in the form of a rod-shaped stream of molten glass of circular section.

In FIGURE 1 there are shown six moulding positions equispaced around the table 1, and at each mouding position there is a hole 6 in the table, the apparatus being so arranged that each hole 6 is directly underneath the outlet 3 when that moulding position on the table 1 is at the moulding station. If it were not intercepted the descending body 5 of molten glass would fall through the hole 6 at the moulding station.

A fixed anvil 7 is mounted on the outer side of the path of descent of the molten glass 5. This anvil 7 is of rectangular form and is mounted on a pressure plate 8. The anvil extends over the edge of the table 1 so that the flat front face 9 of the anvil is disposed in proximity to the descending body 5 of molten glass.

A mould 10 is mounted on the table 1 at each moulding position, and the moulds 10 illustrated in FIGURES 1 and 2 each have a concave mould cavity 11 for forming a high-power lens. The cavity 11 of the mould 10 at the moulding station faces the flat face 9 of the anvil 7.

Each of the moulds 10 is mounted on one end of a stem 12 which is slidably carried in a block 13 fixed to the table 1. A return spring 14 extends between the block 13 and stops 15 fixed to the other end of the stem 12. The spring 14 normally maintains the mould 10 withdrawn towards the block.

In the course of the moulding operation at the moulding station the mould 10 is actuated to intercept a predetermined volume of molten glass at the free end of the descending body 5 of molten glass, whereby the mould 10 meters that volume and imprisons that volume against the anvil 7.

Actuating means are provided to thrust the mould towards the anvil, and the actuating means includes a cylinder 16 fixed to the shaft 2. A piston is slidable in the cylinder and is connected to a piston rod 17 which thrusts the stem 12 carrying the mould 10 towards the anvil, when fluid under pressure is supplied to the cylinder. This thrust is against the action of the return spring 14 which returns the mould to the position shown in FIGURES 1 and 2 when the fluid pressure in the cylinder 16 is relieved.

Shears 18 are provided, in well known manner, just above the mould 10 and anvil 17 and at the same time as the mould 10 intercepts the descending body 5 of molten glass, the shears 18 operate to sever the intercepted glass from the free end of the descending body 5. Alternatively the shears 18 may operate to sever the intercepted glass just after the mould 10 has intercepted the glass.

The moulding operation will now be described in greater detail with reference to FIGURES 3 to 6. The lower end of the descending body 5 of molten glass has a cooled skin owing to the cooling action of the shears 18 in the last moulding operation and the shape of the lower end of the body 6 still shows a ridge 19, FIGURE 3, where the blades of the shears met. The ridge 19, has two "ears" of cooled glass, one at either end of the ridge.

The moulding operation begins from the position shown in FIGURE 3 in which the lower end of the body 5 of molten glass is just entering the hole 6 in the table. Fluid under pressure is supplied to the cylinder 16 and the piston rod 17 thrusts the stem 12 so that the mould 10 is thrust towards the anvil 7, and intercepts the descending body of molten glass.

Figure 4:
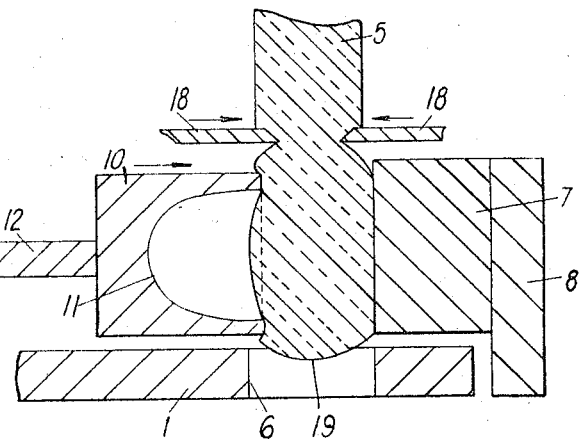
Figure 5:
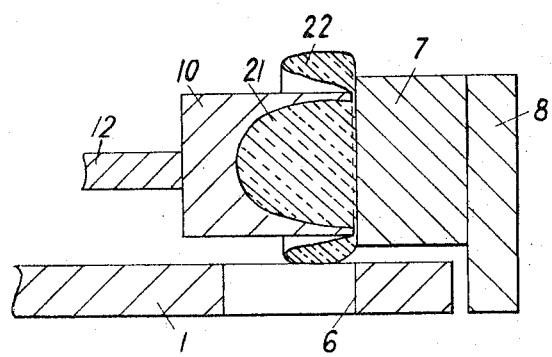

As the mould 10 engages the descending body of glass, the shears 18, move inwardly, as shown in FIGURE 4, to sever the glass intercepted by the mould from the descending body. By the time the mould 10 is thrust against the anvil 7, as shown in FIGURE 5, the intercepted glass has been completely severed from the descending body. The glass at the top of the intercepted glass is cooled by contact with the shears 18.

The mould 10 meters a predetermined volume 21 of the intercepted glass, so that, as shown in FIGURE 5 the ends of the severed glass are excluded from the mould and form a flash 22 surrounding the mould when the mould 10 abuts against the anvil.

All the cooled glass at the top and bottom of the severed glass is thus excluded from the mould, and the metered volume 21 of glass which is imprisoned between the mould and the anvil is at a substantially uniform high temperature, having just left the furnace 4, so that the glass 21 conforms faithfully to the mould cavity 11 without the formation of any surface wrinkle in the lens surface. The lens thus has a brilliant surface finish, approaching a surface of the quality known as "fire-finish," and such lenses are suitable for film or slide projectors without any grinding or polishing being necessary.

Figure 6:
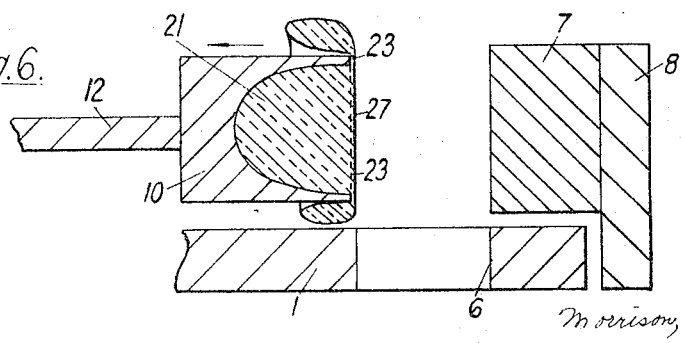

The mould 10 is held against the anvil 7 for just long enough for the glass to stiffen sufficiently to hold its shape. Pressure on the piston in the cylinder 16 is then released, and the mould 10 is returned to its former position by the action of the return spring 14, as shown in FIGURE 6.

As it is returned the mould carries with it the moulded lens 21 in the mould cavity 11, and the surrounding flash 22 which is connected to the lens 21 by a thin annular area of glass 23.

The moulding operation is now complete and the table 1 is rotated to bring the next moulding position to the moulding station under the descending body of glass 5. The moulded lens 21 continues to cool and after two more steps of rotation of the table reaches the take-out station which is diametrically opposite to the moulding station across the table 1. At the take-out station there is a take-out device comprising a vacuum pad 24 mounted on a piston rod 25 connected to a piston sliding in a fixed cylinder 26.

Fluid under pressure is supplied to the cylinder to push the vacuum pad against the plane face 27 of the moulded lens 21 carried in the mould at the take-out station. Suction is applied in well known manner to the vacuum pad 24 so that it grips the face 27 of the lens, and the piston is then retracted in the cylinder 26, so that the moulded lens is carried over the edge of the table and is deposited on a conveyor, indicated at 28 which carries the moulded lenses to an annealing lehr.

It has been found that the flash 22 of glass surrounding the lens breaks off from the lens in the lehr when the lens is being annealed. The annealed lenses which emerge from the lehr have brilliant surfaces and are suitable for such uses as in projectors without any further grinding and polishing. If a greater optical accuracy is necessary the lenses may be subjected to a slight polishing operation.

By the method according to the invention it is possible to mould aspherical lenses for projectors with such a good surface finish that no further processing of the lenses is necessary. This is particularly advantageous because aspherical lenses are very difficult to grind and polish successfully.

Other glass articles, such as insulators in which a good surface finish is an advantage, may be moulded by the method of the invention by suitably shaping both the mould 10 and the co-operating face of the anvil. That is the moulding operation may be effected with two mould members disposed on opposite sides of the descending body of molten glass, either or both of which mould members may be moved by the actuating means to intercept the descending body. Further the moulding operation according to the invention may be carried out using a three piece mould such as a ring mould.

To assist the moulding of differently shaped articles such as insulators the descending body 5 of molten glass may advantageously be shaped to have an elongated oval section.

The invention also comprehends glass articles moulded by a method according to the invention, which have a good surface finish, that is a freedom from surface wrinkle, and in particular the invention comprehends moulded glass lenses produced by this moulding method, which have brilliant surfaces, for example moulded aspherical projector lenses.

I claim:
1. Apparatus for moulding glass articles, comprising means for forming a descending body of molten glass, a fixed anvil mounted beneath and to one side of the forming means, a rotatable table mounted beneath and on the other side of said forming means, a plurality of displaceable moulds mounted on said table, means for rotating the table step-wise through a number of stations including a moulding station at which the moulds are successively located opposite the anvil and a take-out station at which moulded articles are removed from the moulds, actuating means operable to thrust each mould when it is at the moulding station towards the anvil whereby the mould intercepts horizontally a predetermined volume of said descending body of molten glass and imprisons that volume against the anvil and shears mounted above the anvil and operable to sever the intercepted glass from the descending body, said actuating means being further operable to withdraw the mould from the anvil when the moulded glass has stiffened sufficiently to hold its shape.

2. Apparatus according to claim 1, wherein each mould is mounted on one end of a stem slidably carried in a block fixed to the table, a return spring extends between said block and a stop fixed to the other end of the stem, which spring normally maintains the mould withdrawn towards the block, and the actuating means includes means fixed relative to the anvil at the moulding station and operable to thrust the stem carrying the mould towards the anvil and to hold the mould against the anvil for a predetermined time before retraction of the thrusting means permits the return spring to withdraw the mould carrying the moulded article.

3. Apparatus according to claim 2, wherein the thrusting means includes a cylinder fixed relative the anvil, a piston slidable in the cylinder and connected to a piston rod which transmits thrust to said stem, and means for supplying fluid under pressure to the cylinder to control the movement of the piston in time with the step-wise rotation of the table.

References Cited by the Examiner

UNITED STATES PATENTS

| | | | |
|---|---|---|---|
| 2,023,781 | 12/1935 | Cramer | 65—66 X |
| 2,045,699 | 6/1936 | Cramer | 65—184 X |
| 2,263,127 | 11/1941 | Gray | 65—127 |
| 2,433,013 | 12/1947 | Ziegler | 65—146 |
| 2,807,121 | 9/1957 | Hamilton | 65—184 X |
| 3,240,582 | 3/1966 | Stutske | 65—78 |

FOREIGN PATENTS 599,910  3/1948  Great Britain.

DONALL H. SYLVESTER, *Primary Examiner.*

F. W. MIGA, *Assistant Examiner.*